United States Patent
Rothman et al.

(10) Patent No.: US 7,290,178 B2
(45) Date of Patent: Oct. 30, 2007

(54) METHODS AND APPARATUS TO ENABLE CODE-BASED BUS PERFORMANCE ANALYSIS

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 10/817,173

(22) Filed: Apr. 2, 2004

(65) Prior Publication Data

US 2005/0240828 A1 Oct. 27, 2005

(51) Int. Cl.
*G06F 11/00* (2006.01)
(52) U.S. Cl. .............................. 714/39; 714/43; 718/1; 718/101
(58) Field of Classification Search ................. 714/39, 714/37, 43; 718/1, 101
See application file for complete search history.

(56) References Cited

U.S. PATENT DOCUMENTS 5,029,070 A * 7/1991 McCarthy et al. .......... 711/143

6,961,806 B1 * 11/2005 Agesen et al. ................. 711/6

OTHER PUBLICATIONS

Silicon Control, Inc., *850 System Analyzer/Exerciser*, http://www.silicon-control.com/PCI1850%20data%20sheet.pdf.
Silicon Control, Inc., *PCI850—Advanced PCI Bus Analyzer/Exerciser*, http://www.silicon-control.com/PCI850%20Product%20Sheet.pdf.
Silicon Control, Inc., *PCI850 Users Manual*, 16, 49-55 (May 2003), http://www.silicon-control.com/PCI850%20Users%20Guide.pdf.
Silicon Control, Inc., *PCI-X Bus Analyzer*, http://www.silicon-control.com/pci8520.htm.
Extensible Firmware Interface Specification, Intel Corporation, Version 1.10, Dec. 1, 2002, 1084 pages.
Extensible Firmware Interface Specification, Version 1.10, Specification Update, Intel Corporation, Version -001, Nov. 26, 2003, 63 pages.

* cited by examiner

*Primary Examiner*—Yolanda L Wilson
(74) *Attorney, Agent, or Firm*—Hanley, Flight & Zimmerman, LLC

(57) ABSTRACT

Methods and apparatus to enable code-based bus performance analysis are disclosed. In one example, a method identifies a bus transaction request with a virtual machine monitor and stores a record associated with the bus transaction request in a virtual machine.

41 Claims, 6 Drawing Sheets

METHODS AND APPARATUS TO ENABLE CODE-BASED BUS PERFORMANCE ANALYSIS

TECHNICAL FIELD

The present disclosure is directed generally to computer systems and, more particularly, to methods and apparatus to enable code-based bus performance analysis.

BACKGROUND

Bus performance analysis such as transaction turn-around times and performance tuning provide useful mechanisms for debugging device drivers that initiate transactions with hardware devices via a bus. Current bus performance analysis techniques require the use of a hardware bus analyzer inserted into the bus under analysis.

Hardware bus analyzers have many shortcomings, such as cost, compatibility, scalability, and capability. For example, the cost of a typical hardware bus analyzer may exceed many thousands of dollars. When analyzing a peripheral component interconnect (PCI) bus, an industry standard architecture (ISA) hardware bus analyzer is not compatible with the PCI bus and therefore a PCI hardware bus analyzer is required. The hardware bus analyzer solution has poor scalability because it requires a one-to-one relationship between the hardware to be analyzed (i.e., the bus) and the number of hardware bus analyzers required. For example, to test a software or firmware device driver that initiates more than one transaction with more than one bus requires more than one hardware bus analyzer. Additionally, the capability of hardware bus analyzers is also a drawback. For example, the trace capability of a typical hardware bus analyzer is limited in size and functionality by the hardware bus analyzer, which typically has only one megabyte of trace capability.

DETAILED DESCRIPTION

In general, the methods and apparatus disclosed herein may be used to enable code-based bus performance analysis by capturing bus transaction activity via software and/or firmware. More specifically, some or all of the functionality of a hardware bus analyzer may be performed by software and/or firmware in a more cost-efficient, flexible, scalable, and productive fashion.

Figure 1:
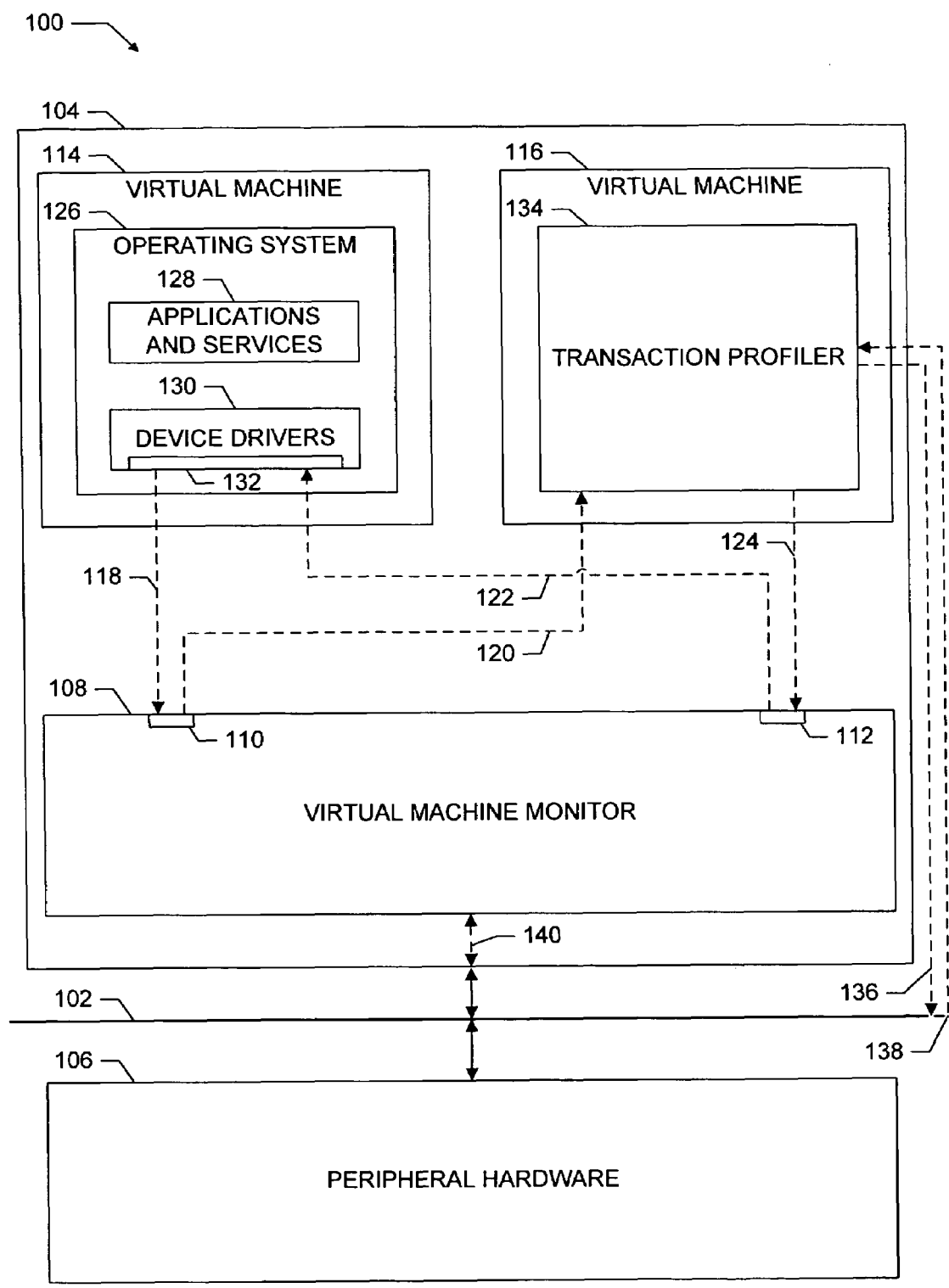
FIG. 1 is a functional block diagram of an example code execution system that may be configured to enable code-based bus performance analysis.

FIG. 1 is a functional block diagram of an example code execution system 100 configured to enable code-based bus performance analysis. The code execution system 100 includes a bus 102 that is serially imposed between a processor 104 and peripheral hardware 106.

The bus 102 and the processor 104 may be similar or identical to the bus 614 and the processor 602, respectively, discussed in further detail below in conjunction with FIG. 6. The peripheral hardware 106 is hardware that is not part of the elementary computer system and may be implemented as a disk controller and mass storage (e.g., the disk controller and mass storage 620 of FIG. 6), an adapter card (e.g., the adapter card 630 of FIG. 6), an input device (e.g., the input device 616 of FIG. 6), a network adapter (e.g., the network adapter 636 of FIG. 6), a removable storage device drive (e.g., the removable storage device drive 624 of FIG. 6), etc.

The processor 104 may include one or more of any type of well-known processor, such as a processor from the Intel® family of microprocessors having virtualization hardware, which allows for virtualization of hardware for a computer system, which may be implemented by a virtual machine monitor (VMM) 108 having a first application programming interface (API) 110 and a second API 112 that are communicatively coupled to a virtual machine (VM) 114 and a VM 116 via a plurality of communication links 118, 120, 122, and 124.

The VMM 108 may be a firmware or a software component that is configured to enable and support a series of virtual environments or VMs (e.g., the VM 114 and the VM 116). The VMM 108 ensures that the operation of each of the plurality of VMs does not interrupt the operation of any other VM. In particular, the VMM 108 takes control of the code execution system 100 when one of the plurality of VMs attempts to perform an operation that may affect other VMs and/or the processor 104.

The API 110 and the API 112 (i.e., a plurality of APIs) serve as a well-defined or published interface between the VMM 108 and the VM 114 and the VM 116 that make up a plurality of VMs. The plurality of VMs operates like a complete physical machine that can run instances of different and/or the same operating system (OS). For example, a first VM may include an OS such as the Microsoft® Windows® XP OS, a second VM may include an OS such as the Microsoft® Windows® 95 OS, and a third VM may include an OS such as the Linux OS. Typically, a crash of an OS in one of the plurality of VMs may not affect an OS executing in a different VM because the VMs have isolated resources. For example, the Microsoft® Windows® XP OS in the first VM and the Linux OS in the third VM may not be affected by a crash in the Microsoft® Windows® 95 OS in the second VM. The OS 126 may be any of the above mentioned OSs, such as a Microsoft® Windows® OS, UNIX® OS, Linux OS, etc.

The VM 114 includes an OS 126 having a plurality of applications and services 128 and a plurality of device drivers 130 that include a code library 132. The VM 116 includes a transaction profiler 134 that is communicatively coupled to the bus 102 via a write communication link 136 and a read communication link 138. Similarly, the VMM 108 is communicatively coupled to the bus 102 via a communication link 140.

The applications and services 128 may include any application or service running on the OS 126. For example, the applications and services 128 may include programs such as Microsoft® Word™, IBM®, Lotus Notes®, etc. that include instructions compiled, interpreted, or assembled from source code written in a computer programming language such as C/C++, Java, .NET, practical extraction and reporting language (Perl), assembly language, or any other suitable programming language.

Figure 6:
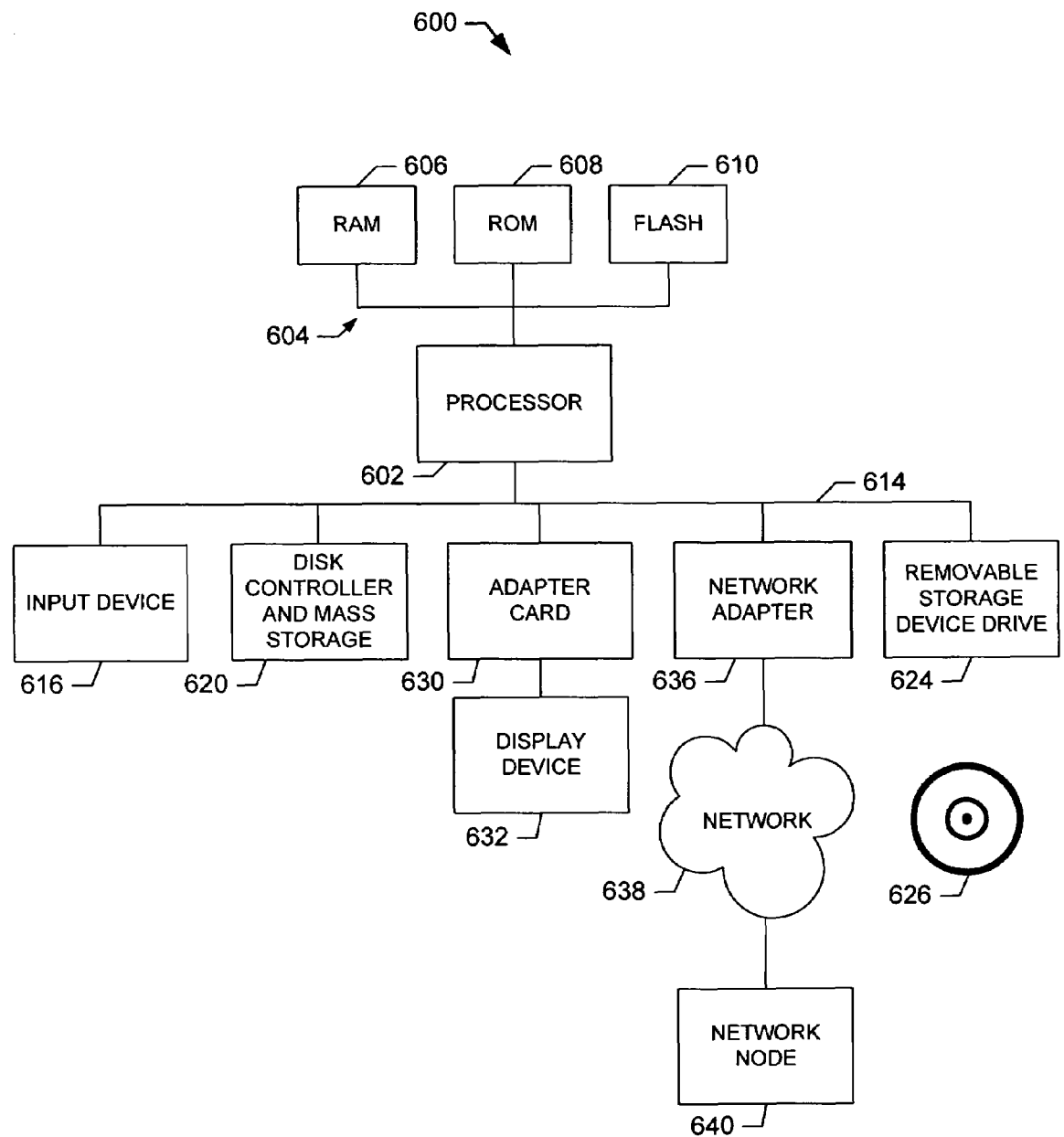
FIG. 6 is a block diagram of an example processor system with which the example methods and apparatus disclosed herein may be implemented.

The device drivers 130 may be software or firmware programs that enable the use of a device (e.g., the devices 616, 620, 630, 640, and 624 of FIG. 6). For example, the device drivers 130 may include instructions compiled or assembled from source code written in a computer programming language such as C/C++, assembly language, or any other suitable programming language.

The code library 132 may be software or firmware that enables the device drivers 130 to communicate with the VMM 108. For example, the code library 132 may include a function, a macro, etc. capable of generating the communication link 118 and a function, macro, call-back function, etc. capable of receiving data through the communication link 122. While the device drivers 130 are shown as using the code library 132 to communicate with the VMM 108, one of ordinary skill in the art will readily appreciate that communication between the device drivers 130 and the VMM 108 may be accomplished without the use of the code library 132. For example, instructions embedded directly in the code of the device drivers 130 may enable communication with the VMM 108.

The transaction profiler 134 may be one or more software or firmware programs that are capable of communicating directly with the bus 102. For example, the transaction profiler 134 may be an application, a service, a device driver, etc. that executes with or without the assistance of an OS. The transaction profiler 134 reads and writes to one or more buses and stores logging information associated with the bus activity.

Figure 2:
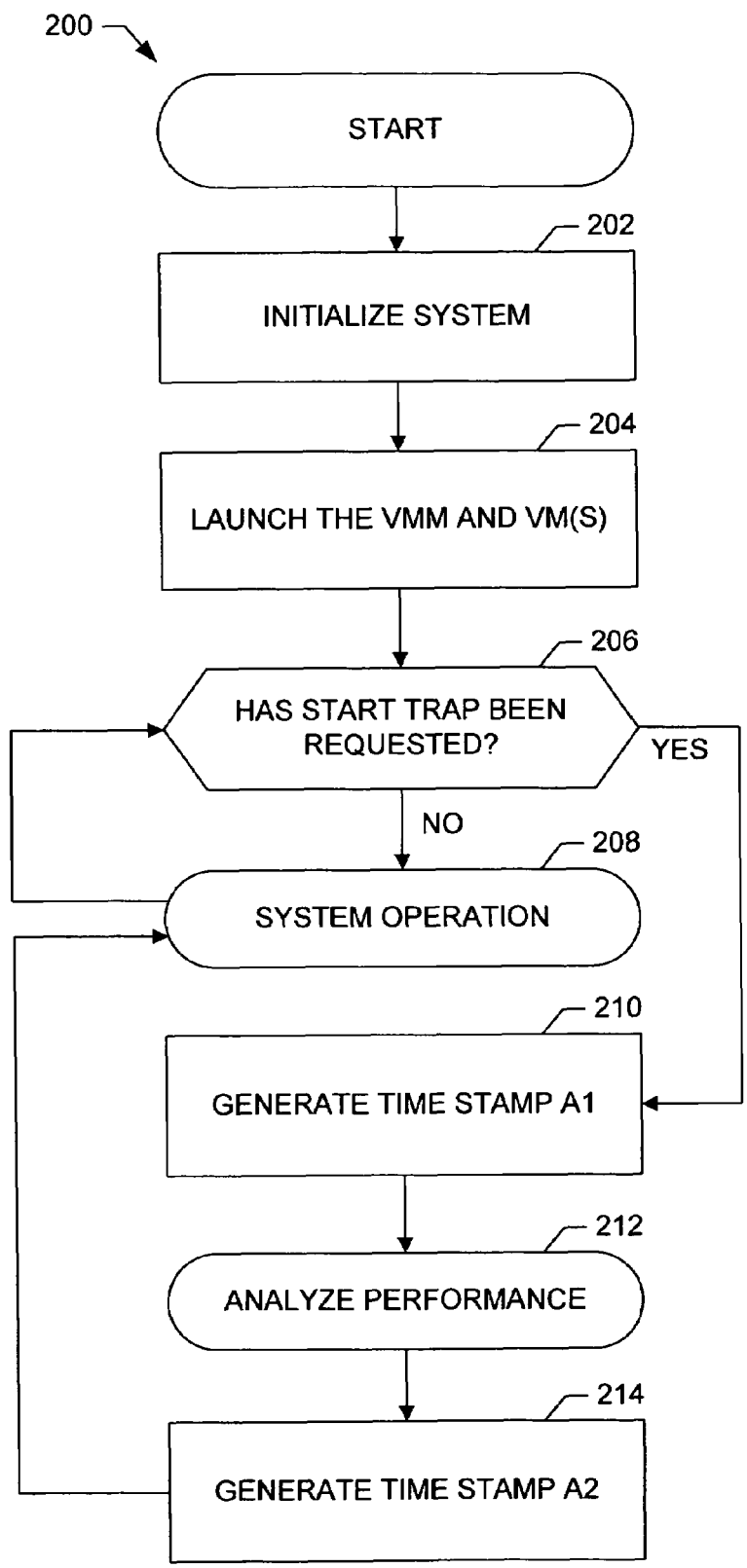
FIG. 2 is a flow diagram of an example process for enabling code-based bus performance analysis according to an embodiment.

FIG. 2 is a flow diagram of an example process for enabling code-based bus performance analysis 200. The process 200 may be implemented by firmware or software on a processor, such as the processor 104 of FIG. 1. While the following describes actions taken by the processor 104 in the implementation of FIG. 2, it will be readily understood that the process 200 is not limited to execution on the example processor 104 and such a description is for purposes of clarity. The processor 104 begins execution of the process 200 by initializing the system (block 202). The initialization of the system (block 202) may include initializing the memory (e.g., the RAM 606 of FIG. 6, etc.), initial loading of a plurality of drivers, and preparing to boot the system, etc. The processor 104 tests whether hardware such as memory, peripherals, and/or disk drives are functioning properly prior to booting the VMM 108 and one or more VMs (e.g., the VM 114 and the VM 116). For example, the processor 104 may check whether a keyboard and/or a mouse are connected to the code execution system 100. In another example, the processor 104 may check whether a disk (e.g., the removable storage media 626 of FIG. 6) is inserted into a disk drive (e.g., the removable storage device drive 624 of FIG. 6).

After initialization of the system (block 202), the processor 104 launches the VMM 108 and one or more VMs (e.g., the VM 114 and VM 116) (block 204). The VMM 108, which is executing in the processor 104, virtualizes and boots up the VMs to partition the resources of the code execution system 100. Each of the plurality of the VMs operates as if the all resources of the code execution system 100 are at the disposal of the VM and the VMM 108 coordinates the usage of the resources.

After launching the VMM 108 and one or more VMs (block 204), the processor 104 determines if a start trap command has been requested from a requester (e.g., the code library 132 of the VM 114) (block 206). The processor 104 may implement the start trap command as a function, a macro, an inline instruction, an interrupt based instruction, a flag based instruction, or any other programming construct. For example, the start trap command may be implemented as a start trap function including a port address parameter that specifies a port address or a range of port addresses to be used as criteria for trapping. The start trap function may be part of the API 110 of the VMM 108. When invoked by the requester (e.g., the code library 132 of the VM 114 or any other suitable requester), the start trap function may generate the communication link 118 and information about the requester (e.g., a callback function, an identifier of the VM, etc.). The information about the requester, which may be used for communicating with the requester, may be stored by the VMM 108. If the start trap command has not been requested from the requester (e.g., the code library 132 of the VM 114) (block 206), the processor 104 performs system operations (block 208). The system operations may perform normal OS operations until a function call, an interrupt based instruction, a flag based instruction, etc. is invoked, causing the processor 104 to determine if the start trap command has been requested from the requester (e.g., the VM 114) (block 206).

On the other hand, if the start trap command has been requested from the requester (e.g., the code library 132 of the VM 114) (block 206), the processor 104 generates a time stamp (e.g., a time stamp A1) (block 210). The time stamp may be generated by the transaction profiler 134, the VMM 108, etc. and is representative of a time (e.g., a current time) at which an event occurs in a program. For example, the time stamp may be generated by the processor 104 based on a hardware timer. In particular, the time stamp may be generated by calling a function defined by an API specified by a programming language. For example, calling the C language function time ( ) returns the current time as a time stamp.

After generating the time stamp (block 210), the processor 104 invokes an analyze performance process (block 212). The analyze performance process performs code-based bus performance analysis on the bus 102. The analyze performance process is described below in greater detail in conjunction with FIG. 3.

After returning from execution of the analyze performance process (block 212), the processor 104 generates a time stamp (e.g., a time stamp A2) (block 214) and then returns control to block 208. The time stamp A2 may be generated by the transaction profiler 134, the VMM 108, etc. and may implement a method similar or identical to the time stamp generation method described above in conjunction with block 210.

Figure 3:
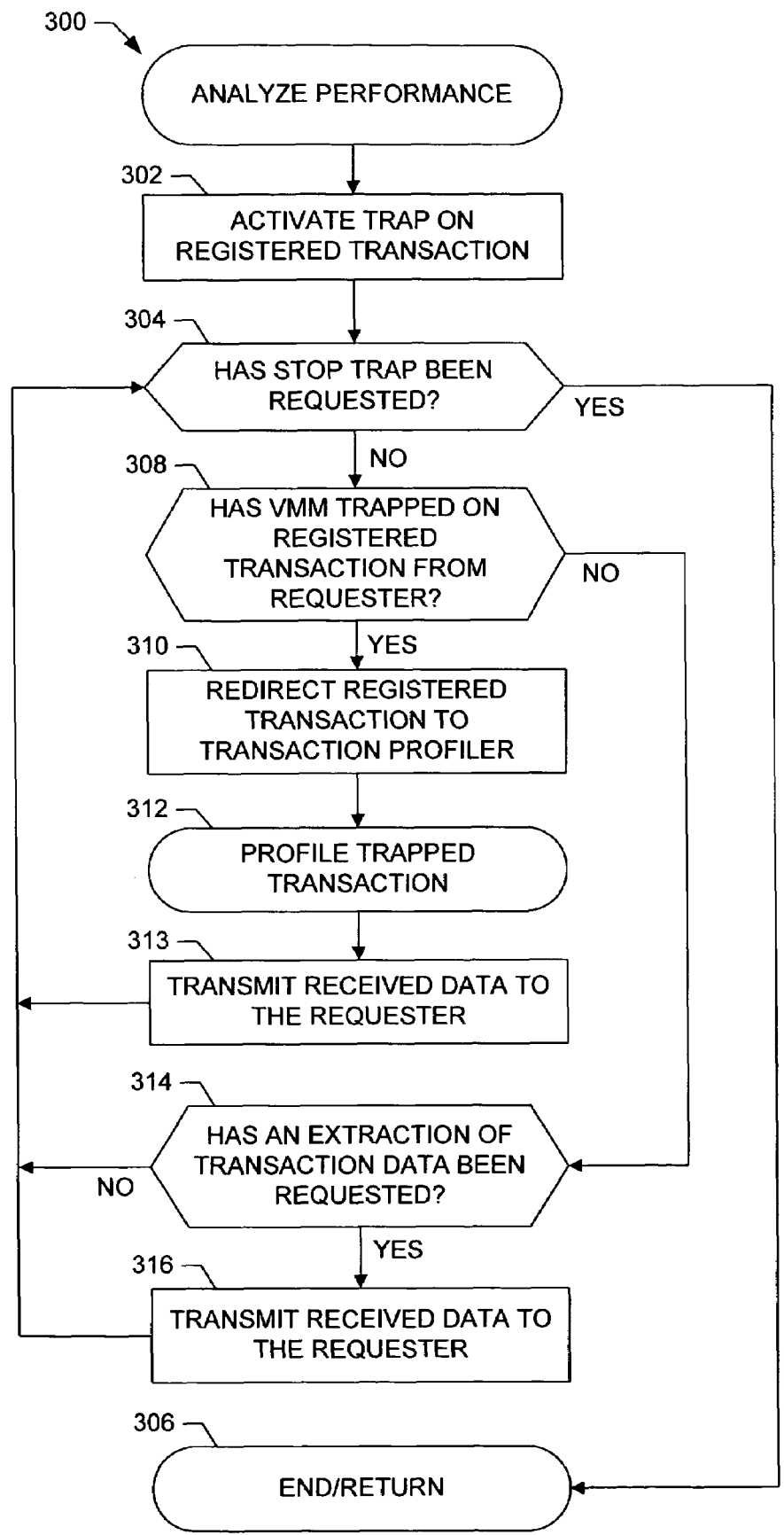
FIG. 3 is a flow diagram of an example process for analyzing bus performance according to an embodiment.

FIG. 3 is a flow diagram of an example analyze performance process 300 for analyzing performance of a bus, such as the bus 102 of FIG. 1. As with FIG. 2, the process 300 of FIG. 3 is described in relation to components of FIG. 1. In particular, the process 300 is described as being implemented in the VMM 108 that executes on the processor 104. The analyze performance process 300 includes registered transaction checking, trapped transaction profiling, and bus extraction methods. The VMM 108 begins execution of the analyze performance process 300 by activating a trap on a registered transaction (block 302). A trap is an executable instruction or set of instructions used to monitor one or more port addresses. A registered transaction is a transaction that has been requested to be transmitted on a monitored port address (i.e., a registered transaction is a transaction having a corresponding trap). According to one example, the VMM 108 may activate the trap by storing the port address to be monitored in a memory location as a trap variable. While, for example purposes, the registered transaction is discussed as being a single registered transaction, the registered transaction may be implemented as a plurality of registered transactions. For example, the trap variable may be implemented as an array of variables, a queue of variables, a stack of variables, a list of variables, or any other suitable data structure and the receipt of a registered transaction may insert a new value into the trap variable data structure.

After activating the trap on the registered transaction (block 302), the VMM 108 determines if a stop trap command has been requested from a requester (e.g., the code library 132 of the VM 114) (block 304). The VMM 108 may implement the stop trap command as a function, a macro, an inline instruction, an interrupt based instruction, a flag based instruction, or any other programming construct. For example, the stop trap command may be implemented as a stop trap function including a port address parameter that specifies a port address or a range of port addresses no longer to be used as criteria for trapping. The stop trap function may be part of the API 110 of the VMM 108 and, when invoked by the requester (e.g., the code library 132 of the VM 114 or any other suitable requester), may generate the communication link 118. If the stop trap command has been requested from the requester (e.g., the code library 132 of the VM 114) (block 304), the analyze performance process 300 ends and/or returns control to any calling routine(s) (block 306).

On the other hand, if the stop trap command has not been requested from the requester (e.g., the code library 132 of the VM 114) (block 304), the analyze performance process 300 determines if the VMM 108 has trapped on the registered transaction from a requester (i.e., has received a transaction to be monitored) (block 308). The received transaction is a transaction that is transmitted from the requester (e.g., the VM 114) to the API 110 of the VMM 108 via the communication link 118. The VMM 108 may compare the port address of the received transaction from the VM 114 to the trap variable for a match, and if a match occurs, the VMM 108 may determine that that the registered transaction has been trapped.

If the VMM 108 has trapped on a registered transaction (block 308), the VMM 108 redirects or proxies the registered transaction to the transaction profiler 134 (block 310) and invokes a profile trapped transaction process (block 312). The registered transaction is redirected by the VMM 108 to the transaction profiler 134 via the communication link 120 (block 310) to allow the transaction profiler 134 to process a trapped transaction (i.e., the received transaction from the VM 114). Additionally or alternatively, the redirecting and invocation of the profile trapped transaction process may be implemented as a single activity. The profile trapped transaction process profiles and records information about the execution of the trapped transaction and is described below in greater detail in conjunction with FIG. 4.

After returning from execution of the profile trapped transaction process (block 312), the VMM 108 transmits the received data (i.e., data that has been received on the bus 102) to the requester (block 313) and returns control to block 304. The transmission of the received data may be implemented as a function call, a macro call, an inline instruction, an interrupt based instruction, a flag based instruction, or any other programming construct. The function that is called may be, for example, a call-back function in the code library 132 and/or the device drivers 130 of the VM 114 and the function call may generate the communication link 122.

On the other hand, if the VMM 108 has not trapped on the registered transaction from the requester (block 308), the VMM 108 determines if an extract transaction data command has been requested (block 314). The extract transaction data command may be implemented as a function call, a macro, an inline instruction, an interrupt based instruction, a flag based instruction, or any other programming construct. For example, the extract transaction data command may be implemented as an extract transaction data function including a port address parameter that specifies a port address or a range of port addresses from which to extract the data. The extract transaction data function is invoked by a requester (e.g., the code library 132) and information about the requester (e.g., a callback function, an identifier of the VM, etc.), which may be used for communicating with the requester, may be stored by the VMM 108. The requester may be the same as or different from the requester. If the extract transaction data command has not been requested (block 314), the VMM 108 returns control to block 304.

On the other hand, if the extract transaction data command has been requested (block 314), the VMM 108 transmits the received data to the requester (block 316) and then returns control to block 304. The received data may be requested by a requester (e.g., the requester) via the communication link 118 (block 314), then the VMM 108 may request the data from the transaction profiler 134 via the communication link 120, then the data may be transmitted from the transaction profiler 134 to the VMM 108 via the communication link 124, and then further from the VMM 108 to the requester (e.g., the VM 114) via the communication link 122 (block 316).

Figure 4:
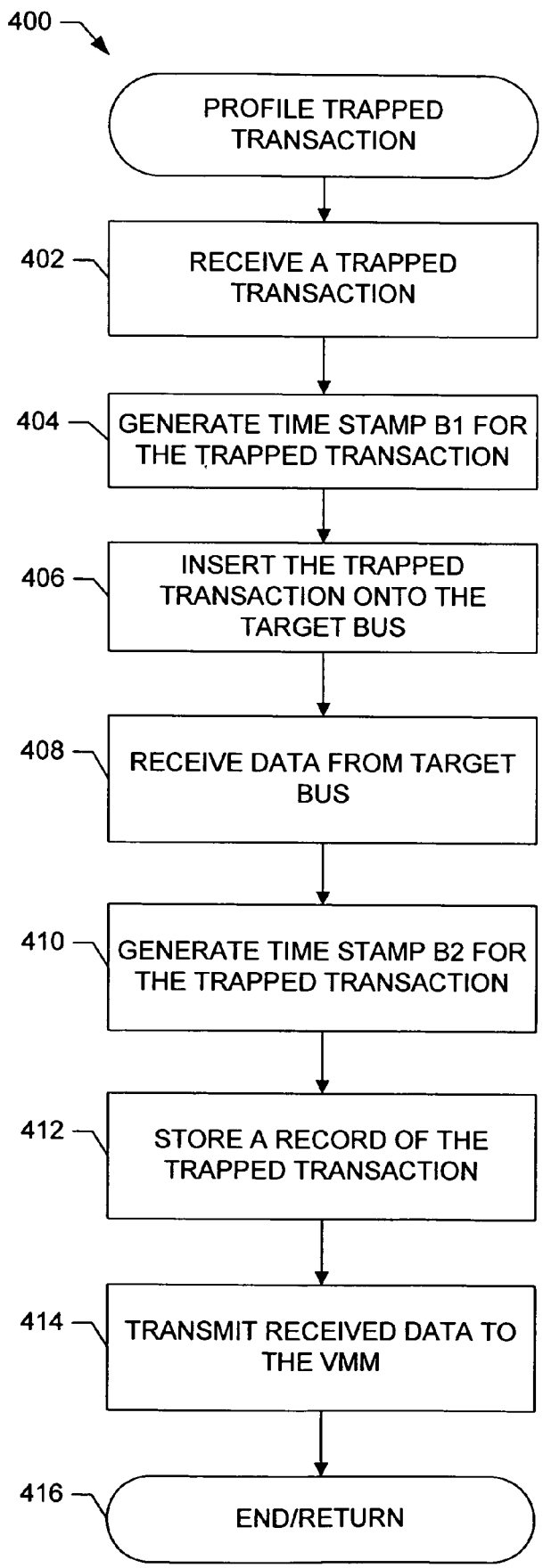
FIG. 4 is a flow diagram of an example process for profiling a trapped transaction according to an embodiment.

FIG. 4 is a flow diagram of an example profile trapped transaction process 400 that may be used to implement the profile trapped transaction process 312 of FIG. 3. As with FIGS. 2 and 3, the process 400 of FIG. 4 is described in relation to components of FIG. 1. The profile trapped transaction process 400 may be implemented in the transaction profiler 134 and profiles and records profiling results of bus transactions on the bus 102. For example, the profiling results may be used by a human or a machine to determine a missing response to a write request to the bus 102 and/or to determine a latency time between when data is written to the bus 102 and when data is received as a response on the bus 102. The transaction profiler 134 begins execution of the profile trapped transaction process 400 by receiving a trapped transaction from the VMM 108 (block 402). For example, the trapped transaction may be received by the transaction profiler 134 via the communication link 120.

After receiving a trapped transaction (block 402), the transaction profiler 134 generates a time stamp (i.e., a time stamp B1) that is associated with a time before the processing of the trapped transaction (block 404). The time stamp B1 may be generated using a method similar or identical to the time stamp generation method described above in conjunction with block 210 of FIG. 2.

After generating the time stamp B1 (block 404), the transaction profiler 134 inserts the trapped transaction onto the target bus (e.g., the bus 102) (block 406). The transaction profiler 134 may insert the trapped transaction onto the target bus (e.g., via the write communication link 136) without transmitting the trapped transaction to the VMM 108 to avoid temporal latencies associated with the VMM 108.

After inserting the trapped transaction onto the target bus (block 406), the transaction profiler 134 receives data from the target bus (block 408). For example, the transaction profiler 134 may wait until data on the target bus is received on the requested port address (e.g., via the read communication link 138). Additionally, a timeout period may be implemented to stop waiting for the data if the data is not received.

After receiving the data on the target bus (block 408), the transaction profiler 134 generates a time stamp (i.e., a time stamp B2) that is associated with a time after the processing of the trapped transaction (block 410). The time stamp B2 may be generated using a method similar or identical to the time stamp generation method described above in conjunction with block 210 of FIG. 2.

After generating the time stamp B2 (block 410), the transaction profiler 134 stores a record of the trapped transaction (block 412). The record is information associated with the trapped transaction and may include the port address, the time stamp B1, the time stamp B2, historical data, such as if data was returned on the target bus, etc. The record may be stored in one or more database files (e.g., a Microsoft Access database, an IBM DB2 database, database products from companies such as Oracle, Sybase, and Computer Associates, etc.), structures in memory (e.g., the system memory 604 of FIG. 6), and/or any other suitable data storage mechanism or structure.

After storing a record of the trapped transaction (block 412), the transaction profiler 134 transmits the received data to the VMM 108 (block 414) and the process 400 ends and/or returns control to any calling routine(s) (block 416). For example, the received data may be transmitted via the communication link 124 to the API 112 and, as discussed in further detail above in conjunction with block 316 of FIG. 3, the API 112 may transmit the received data to the requester (e.g., the VM 114) via the communication link 122.

Figure 5:
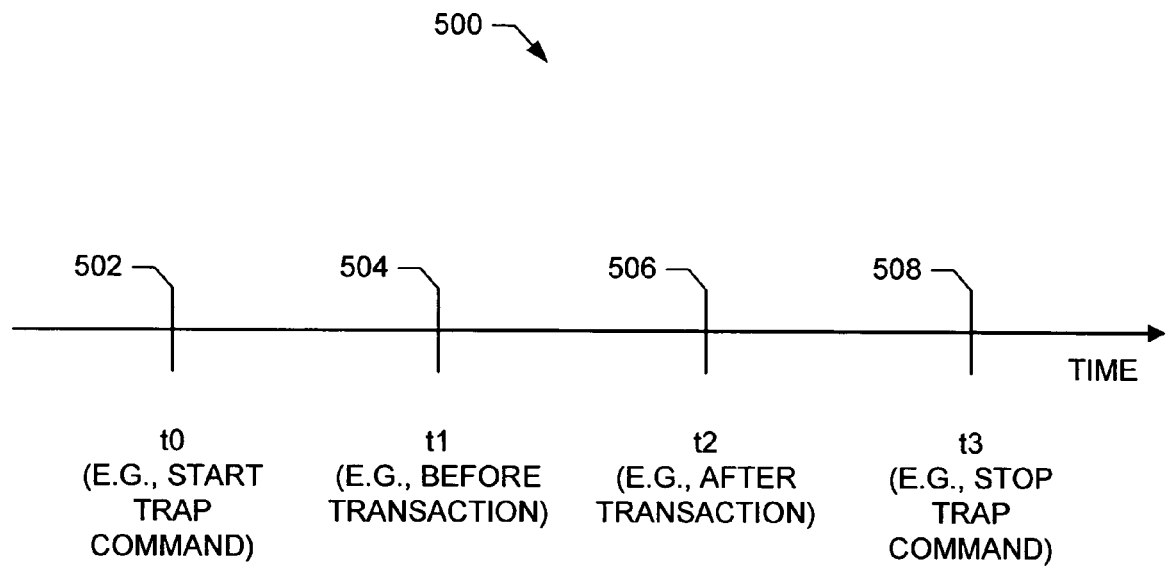
FIG. 5 is a timing diagram of an example execution of the example process of FIG. 2 according to an embodiment.

FIG. 5 is a timing diagram 500 of an example execution of the example process of FIG. 2. The timing diagram 500 includes a start trap time stamp 502, a before transaction time stamp 504, an after transaction time stamp 506, and a stop trap time stamp 508 shown in a temporal relation where the left-most time stamp (i.e., the start trap time stamp 502) is generated prior to the right-most time stamp (i.e., the stop time stamp 508).

The start trap time stamp 502 is associated with the time at which a start trap has been received (e.g., the time stamp A1 of block 210 of FIG. 2). The stop trap time stamp 508 is associated with the time at which a stop trap has been received (e.g., the time stamp A2 of block 240 of FIG. 2). The start trap time stamp 502 and the stop trap time stamp 508 may be used to calculate the amount of time that occurs in executing one or more instructions. For example, the example pseudo code below shows a function definition called exampleFunction including a start trap function call (i.e., startTrap) and a stop trap function call (i.e., stopTrap) with a device driver that is being tested (i.e., deviceDriver) sequentially interposed between the two function calls.

```
void exampleFunction (void)
{
    startTrap (portAddress);
    deviceDriver( );
    stopTrap (portAddress);
}
```

Upon invocation of exampleFunction, the startTrap function is invoked, which results in the generation of the start trap time stamp 502. After invocation of the startTrap function, the deviceDriver function is invoked. The deviceDriver function may issue, for example, a write request to the port address being monitored (i.e., the value of the portAddress variable). The transaction profiler 134 receives the write request from the VMM 108 and indirectly from the VM 114 as described above in conjunction with block 402 of FIG. 4. The transaction profiler 134 generates the time stamp B1 (i.e., the before transaction time stamp 504) as described above in conjunction with block 404 of FIG. 4 and generates the time stamp B2 (i.e., the after transaction time stamp 506) as described above in conjunction with block 410 of FIG. 4.

Upon completion of the deviceDriver function, the stopTrap function is invoked, which results in the generation of the stop trap time stamp 508. The start trap time stamp 502 and the stop trap time stamp 508 may be used by a human or a machine to calculate the duration of the execution time of the deviceDriver function. The before transaction time stamp 504 and the after transaction time stamp 506 may also be used by a human or a machine to calculate the duration of a first transaction on the bus 102. Additional before and after transaction time stamps may be processed in a similar manner to the before transaction time stamp 504 and the after transaction time stamp 506 and may be used for calculation of the duration of additional transactions requested by the deviceDriver function.

FIG. 6 illustrates an example processor system 600 on which the disclosed processes may be executed. The system 600 includes a processor 602 having associated system memory 604, which may be implemented using, for example, random access memory (RAM) 606, read only memory (ROM) 608, and/or flash memory 610. The processor 602 is coupled to an interface, such as a bus 614, to which other components may be coupled. In the illustrated example, the components interfaced to the bus 614 include an input device 616, a mass storage device 620, and a removable storage device drive 624 that may include associated removable storage media 626, such as magnetic or optical media. The example processor system 600 may also include an adapter card 630 operatively coupled to a display device 632 and a network adapter 636 such as, for example, an Ethernet card or any other card that may be wired or wireless.

The example processor system 600 may be implemented using, for example, a server, a conventional desktop personal computer, a notebook computer, a workstation, or any other computing device. The processor 602 may be any type of processing unit, and may be similar or identical to the processor 104 of FIG. 1.

The memories 606, 608, and 610, which form some or all of the system memory 604, may be any suitable memory devices and may be sized to fit the storage demands of the example processor system 600. The RAM 606 may be implemented using a dynamic random access memory (DRAM), a static random access memory (SRAM), or any other suitable memory device. The flash memory 610 is a low-cost, high-density, high-speed architecture having low power consumption and high reliability. The flash memory 610 is a non-volatile memory that is accessed and erased on a block-by-block basis.

The input device 616 may be implemented using a keyboard, a mouse, a touch screen, a track pad, or any other device that enables a user to provide information to the processor 602. The mass storage device 620 may be, for example, a conventional hard drive or any other magnetic or optical media that is readable by the processor 602. For example, the mass storage device 620 may be a hard drive having storage capacity on the order of hundreds of megabytes to tens or hundreds of gigabytes.

The removable storage device drive 624 may be, for example, an optical drive, such as a CD-R drive, a CD-RW drive, a DVD drive, or any other optical drive. It may alternatively be, for example, a magnetic or solid state media drive. The removable storage media 626 is complementary to the removable storage device drive 624, inasmuch as the media 626 is selected to operate with the removable storage device drive 624. For example, if the removable storage device drive 624 is an optical drive, the removable storage media 626 may be a CD-R disk, a CD-RW disk, a DVD disk, or any other suitable optical disk. On the other hand, if the removable storage device drive 624 is a magnetic media device, the removable storage media 626 may be, for example, a diskette or any other suitable magnetic storage media.

The adapter card 630 may be any standard, commercially available adapter card that is used to interface the processor 602 to the display device 632. The display device 632 may be, for example, a liquid crystal display (LCD) monitor, a cathode ray tube (CRT) monitor, or any other suitable device that acts as an interface between the processor 602 and a user via the adapter card 630. The adapter card 630 is any device used to interface the display device 632 to the bus 614. Such cards are presently commercially available from, for example, Creative Labs and other like vendors.

The network adapter 636 provides network connectivity between the processor 602 and a network 638, which may be a local area network (LAN), a wide area network (WAN), the Internet, public switched telephone network (PSTN), or any other suitable network. The network 638 may include one or more network nodes, such as a network node 640.

The network node 640 may be implemented using a server, a personal computer (PC), a personal digital assistant (PDA), an Internet appliance, a cellular telephone, or any other computing device. In an alternative example processor system, the processor 602 may be operatively coupled to the network node 640 without the assistance of the network 638, such as via a serial adapter, a parallel adapter, the network adapter 636 operatively coupled to a cross-over Ethernet cable, etc.

As shown in FIGS. 2, 3, and 4, the processes 200, 300, and 400 may be implemented using one or more software programs or sets of machine readable instructions that are stored on a machine readable medium (e.g., the system memory 604 and/or the mass storage device 620 of FIG. 6) and executed by one or more processors (e.g., the processor 104 of FIG. 1). However, some or all of the blocks of the processes 200, 300, and 400 may be performed manually and/or by some other device. Additionally, although the processes 200, 300, and 400 are described with reference to the flow diagram illustrated in FIGS. 2, 3, and 4, persons of ordinary skill in the art will readily appreciate that many other methods of performing the processes 200, 300, and 400 may be used instead. For example, the order of many of the blocks may be altered, the operation of one or more blocks may be changed, blocks may be combined, and/or blocks may be eliminated.

Although certain apparatus, methods, and articles of manufacture have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method comprising:
   identifying a bus transaction request with a virtual machine monitor; and
   storing a record associated with the bus transaction request in a virtual machine.

2. A method as defined in claim 1, further comprising performing a bus transaction in response to the bus transaction request.

3. A method as defined in claim 2, wherein storing the record associated with the bus transaction request in the virtual machine comprises storing the record associated with the bus transaction in a transaction profiler.

4. A method as defined in claim 1, further comprising:
   receiving the bus transaction request at the virtual machine; and
   generating a time stamp at the virtual machine.

5. A method as defined in claim 1, further comprising:
   inserting the bus transaction request on a bus; and
   receiving a bus transaction response on the bus at the virtual machine.

6. A method as defined in claim 1, further comprising:
   generating a time stamp at the virtual machine; and
   transmitting a bus transaction response from the virtual machine to the virtual machine monitor.

7. A method as defined in claim 1, wherein the record comprises at least one of a time stamp, the bus transaction request, a bus transaction response, and historical data.

8. A method as defined in claim 1, further comprising writing data to a bus via the virtual machine.

9. A method as defined in claim 1, further comprising reading data from a bus via the virtual machine.

10. A method as defined in claim 1, further comprising:
    identifying a start trap request with the virtual machine monitor; and
    generating a time stamp in response to the start trap request.

11. A method as defined in claim 1, further comprising:
    identifying a stop trap request with the virtual machine monitor; and
    generating a time stamp in response to the stop trap request.

12. A method as defined in claim 1, further comprising:
    identifying an extract data request with the virtual machine;
    receiving data on a bus; and
    transmitting the data via the virtual machine in response to the extract data request.

13. A method as defined in claim 1, wherein the bus transaction request is received from a second virtual machine.

14. An apparatus comprising:
    a processor; and
    a memory coupled to the processor, the memory comprising instructions which when executed by the processor are configured to:
      identify a bus transaction request with a virtual machine monitor; and
      store a record associated with the bus transaction request in a virtual machine.

15. An apparatus as defined in claim 14, wherein the instructions are configured to perform a bus transaction in response to the bus transaction request.

16. An apparatus as defined in claim 15, wherein the instructions are configured to store the record associated with the bus transaction request in the virtual machine by storing the record associated with the bus transaction in a transaction profiler.

17. An apparatus as defined in claim 14, wherein the instructions are configured to:
   receive the bus transaction request at the virtual machine; and
   generate a time stamp at the virtual machine.

18. An apparatus as defined in claim 14, wherein the instructions are configured to:
   insert the bus transaction request on a bus; and
   receive a bus transaction response on the bus at the virtual machine.

19. An apparatus as defined in claim 14, wherein the instructions are configured to:
   generate a time stamp at the virtual machine; and
   transmit a bus transaction response from the virtual machine to the virtual machine monitor.

20. An apparatus as defined in claim 14, wherein the record comprises at least one of a time stamp, the bus transaction request, a bus transaction response, and historical data.

21. An apparatus as defined in claim 14, wherein the instructions are configured to write data to a bus via the virtual machine.

22. An apparatus as defined in claim 14, wherein the instructions are configured to read data from a bus via the virtual machine.

23. An apparatus as defined in claim 14, wherein the instructions are configured to:
   identify a start trap request with the virtual machine monitor; and
   generate a time stamp in response to the start trap request.

24. An apparatus as defined in claim 14, wherein the instructions are configured to:
   identify a stop trap request with the virtual machine monitor; and
   generate a time stamp in response to the stop trap request.

25. An apparatus as defined in claim 14, wherein the instructions are configured to:
   identify an extract data request with the virtual machine;
   receive data on a bus; and
   transmit the data via the virtual machine in response to the extract data request.

26. An apparatus as defined in claim 14, wherein the instructions are configured to receive the bus transaction request from a second virtual machine.

27. An apparatus comprising:
   a transaction profiler;
   a first memory portion including a virtual machine;
   a memory associated with the virtual machine; and
   a second memory portion including a virtual machine monitor communicatively coupled to the transaction profiler and configured to:
      identify a bus transaction request with the virtual machine monitor; and
      store a record associated with the bus transaction request in the memory associated with the virtual machine.

28. An apparatus as defined in claim 27, wherein the transaction profiler is configured to:
   generate a time stamp; and
   transmit a bus transaction response to the virtual machine monitor.

29. A machine readable medium having instructions stored thereon that, when executed, cause a machine to:
   identify a bus transaction request with a virtual machine monitor; and
   store a record associated with the bus transaction request in a virtual machine.

30. A machine readable as defined in claim 29, having instructions stored thereon that, when executed, cause the machine to perform a bus transaction in response to the bus transaction request.

31. A machine readable as defined in claim 30, having instructions stored thereon that, when executed, cause the machine to store the record associated with the bus transaction request in the virtual machine by storing the record associated with the bus transaction in a transaction profiler.

32. A machine readable as defined in claim 29, having instructions stored thereon that, when executed, cause the machine to:
   receive the bus transaction request at the virtual machine; and
   generate a time stamp at the virtual machine.

33. A machine readable as defined in claim 29, having instructions stored thereon that, when executed, cause the machine to:
   insert the bus transaction request on a bus; and
   receive a bus transaction response on the bus at the virtual machine.

34. A machine readable as defined in claim 29, having instructions stored thereon that, when executed, cause the machine to:
   generate a time stamp at the virtual machine; and
   transmit a bus transaction response from the virtual machine to the virtual machine monitor.

35. A machine readable as defined in claim 29, wherein the record comprises at least one of a time stamp, the bus transaction request, a bus transaction response, and historical data.

36. A machine readable as defined in claim 29, having instructions stored thereon that, when executed, cause the machine to write data to a bus via the virtual machine.

37. A machine readable as defined in claim 29, having instructions stored thereon that, when executed, cause the machine to read data from a bus via the virtual machine.

38. A machine readable as defined in claim 29, having instructions stored thereon that, when executed, cause the machine to:
   identify a start trap request with the virtual machine monitor; and
   generate a time stamp in response to the start trap request.

39. A machine readable as defined in claim 29, having instructions stored thereon that, when executed, cause the machine to:
   identify a stop trap request with the virtual machine monitor; and
   generate a time stamp in response to the stop trap request.

40. A machine readable as defined in claim 29, having instructions stored thereon that, when executed, cause the machine to:
   identify an extract data request with the virtual machine;
   receive data on a bus; and
   transmit the data via the virtual machine in response to the extract data request.

41. A machine readable as defined in claim 29, having instructions stored thereon that, when executed, cause the machine to receive the bus transaction request from a second virtual machine.

* * * * *